US006725017B2

(12) United States Patent
Blount et al.

(10) Patent No.: US 6,725,017 B2
(45) Date of Patent: Apr. 20, 2004

(54) MULTI-CHANNEL SELF-INTERFERENCE CANCELLATION METHOD AND APPARATUS FOR RELAYED COMMUNICATION

(75) Inventors: Richard Blount, Vista, CA (US); David H. Irvine, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 10/006,534

(22) Filed: Dec. 5, 2001

(65) Prior Publication Data

US 2003/0104787 A1 Jun. 5, 2003

(51) Int. Cl.[7] .............................................. H04B 17/00
(52) U.S. Cl. ................ 455/67.13; 455/63.1; 455/278.1; 455/283; 455/225; 455/284; 455/296; 455/303; 455/306; 455/307
(58) Field of Search ......................... 455/63, 67.3, 115, 455/225, 218, 278.1, 283, 284, 296, 303, 304, 305, 306, 307, 16

(56) References Cited

U.S. PATENT DOCUMENTS

| 3,419,682 A | 12/1968 | Thompson et al. |
| 3,750,179 A | 7/1973 | Tewksbury |
| 3,993,867 A | 11/1976 | Blood, Jr. |
| 4,086,534 A | 4/1978 | Olson |
| 4,140,972 A | 2/1979 | Enriquez et al. et al. |

(List continued on next page.)

FOREIGN PATENT DOCUMENTS

| EP | 707 389 A2 | 4/1996 |
| EP | 732 814 A2 | 9/1996 |

OTHER PUBLICATIONS

Kato et al., "Novel Satellite Digital Video TDMA System for Business Video Communications," *IEEE J. of Selected Areas in Communication*, 10(6):1054–1065 (1992).

(List continued on next page.)

*Primary Examiner*—William Trost
*Assistant Examiner*—Marcos Torres
(74) *Attorney, Agent, or Firm*—Townsend and Townsend and Crew LLP (57) ABSTRACT

Multi-channel self-interference cancellation is provided in relayed electromagnetic communication between a first device and one or more other devices on one or more shared frequency channels. Specifically, near signals are generated at the first device and transmitted to a relay station. A composite signal is received at the first device from the relay station containing relayed versions of the near signals and relayed versions of remote signals transmitted from the one or more other devices, the composite signal having frequency channels including the one or more shared frequency channels, each shared frequency channel occupied by at least one of the relayed near signals and one of the relayed remote signals. One or more cancellation signals are selectively generated, each having a frequency band corresponding to one of the shared frequency channels. The cancellation signals are combined with the composite signal to produce a desired signal representing the relayed remote signals.

10 Claims, 6 Drawing Sheets

U.S. PATENT DOCUMENTS

| | | | |
|---|---|---|---|
| 4,146,838 A | | 3/1979 | Takada |
| 4,178,550 A | | 12/1979 | Acampora et al. |
| 4,320,498 A | | 3/1982 | Justice |
| 4,385,378 A | | 5/1983 | Kreutel, Jr. |
| 4,393,494 A | | 7/1983 | Belforte et al. |
| 4,450,582 A | | 5/1984 | Russell |
| 4,470,138 A | | 9/1984 | Gutleber |
| 4,516,236 A | | 5/1985 | Hadziomerovi |
| 4,535,445 A | | 8/1985 | Lane et al. |
| 4,593,399 A | | 6/1986 | Baugh et al. |
| 4,679,248 A | * | 7/1987 | McKeown ............... 455/226.1 |
| 4,701,935 A | | 10/1987 | Namiki |
| 4,712,235 A | | 12/1987 | Jones, Jr. |
| 4,896,371 A | | 1/1990 | Kahn |
| 4,952,193 A | | 8/1990 | Talwar |
| 4,995,104 A | | 2/1991 | Gitlin |
| 5,131,032 A | | 7/1992 | Esaki et al. |
| 5,140,699 A | | 8/1992 | Kozak |
| 5,193,112 A | | 3/1993 | Sano |
| 5,280,537 A | | 1/1994 | Sugiyama et al. |
| 5,307,405 A | | 4/1994 | Sih |
| 5,315,585 A | | 5/1994 | Iizuka et al. |
| 5,428,831 A | | 6/1995 | Monzello et al. |
| 5,436,887 A | | 7/1995 | Eisenhuth |
| 5,450,456 A | | 9/1995 | Mueller |
| 5,475,731 A | | 12/1995 | Rasmusson |
| 5,596,439 A | * | 1/1997 | Dankberg et al. ........... 359/161 |
| 5,625,640 A | | 4/1997 | Palmer et al. |
| 5,691,978 A | | 11/1997 | Kenworthy |
| 5,734,967 A | * | 3/1998 | Kotzin et al. ............... 455/63.1 |
| 5,768,254 A | * | 6/1998 | Papadopoulos et al. ..... 370/201 |
| 5,860,057 A | | 1/1999 | Ishida et al. |
| 6,011,952 A | * | 1/2000 | Dankberg et al. .............. 455/24 |
| 6,014,373 A | * | 1/2000 | Schilling et al. ............ 370/342 |
| 6,052,596 A | * | 4/2000 | Barnickel ................... 455/450 |
| 6,317,495 B1 | * | 11/2001 | Gaikwad et al. ............ 379/417 |
| 6,349,109 B1 | * | 2/2002 | Lattard et al. ............... 375/140 |
| 2002/0197958 A1 | * | 12/2002 | Collins et al. ................. 455/63 |

OTHER PUBLICATIONS

Kazama et al., "Experiments on Satellite TDMA System for Multimedia Communications," *Electronics and Communications in Japan*, part 1 84(10):55–65 (2001).

Morikura et al., "SSMA Signal Transmission over QPSK Modulated Signal," *IEEE*, 502.5.1–502.5.5, pp. 751–755 (1990).

Morikura et al., "Superposed Transmission of High Speed QPSK Signals and SSMA–QPSK Signals in Non–Linear Channels," *IEEE*, pp. 727–731 (1992).

Sugiyama et al., "Burst Mode Interference Cancellation for Superposed Transmission of SSMA–QPSK Signals and TDMA–QPSK Signals in Nonlinear Channels," *IEEE* pp. 1612–1616 (1993).

* cited by examiner

MULTI-CHANNEL SELF-INTERFERENCE CANCELLATION METHOD AND APPARATUS FOR RELAYED COMMUNICATION

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to a radio frequency or optical communication system in which a relay station is used to aid communication between a device and one or more other devices, and more particularly to an improvement allowing more efficient use of the available channel resource.

Self-interference cancellation is a theoretically efficient technique for removing interference on a channel containing a remote signal and a near signal in relayed communication between two or more devices involving the transmission of different signals within the same frequency band at the same time. In the example of communication between two devices, such transmission results in a composite signal that includes two signals, one originating from each device. As each device attempts to receive the signal originating from the other device (remote signal), it is hindered by interference caused by the signal originating from itself (near signal). Thus, self-interference cancellation works by generating a cancellation signal resembling the device's own near signal and using the cancellation signal to remove at least a portion of the near signal from the composite signal to obtain a signal closer to the desired remote signal. A number of self-interference cancellation and related techniques have been disclosed in U.S. Pat. Nos. 5,596,439 and 6,011,952, both issued to Dankberg et al., U.S. Pat. No. 5,280,537 issued to Sugiyama et al., U.S. Pat. No. 5,625,640 issued to Palmer et al., U.S. Pat. No. 5,860,057 issued to Ishida et al., and U.S. patent application Ser. No. 09/925,410 entitled METHOD AND APPARATUS FOR RELAYED COMMUNICATION USING BAND-PASS SIGNALS FOR SELF-INTERFERENCE CANCELLATION.

However, special problems exist when a composite signal containing multiple channels requires self-interference cancellation. Self-interference may exist on fewer than all the channels. If the number of channels containing self-interference is less than the total number of channels, unnecessary resources and equipment may be committed, and there may be avoidable signal degradation.

Figure 1:
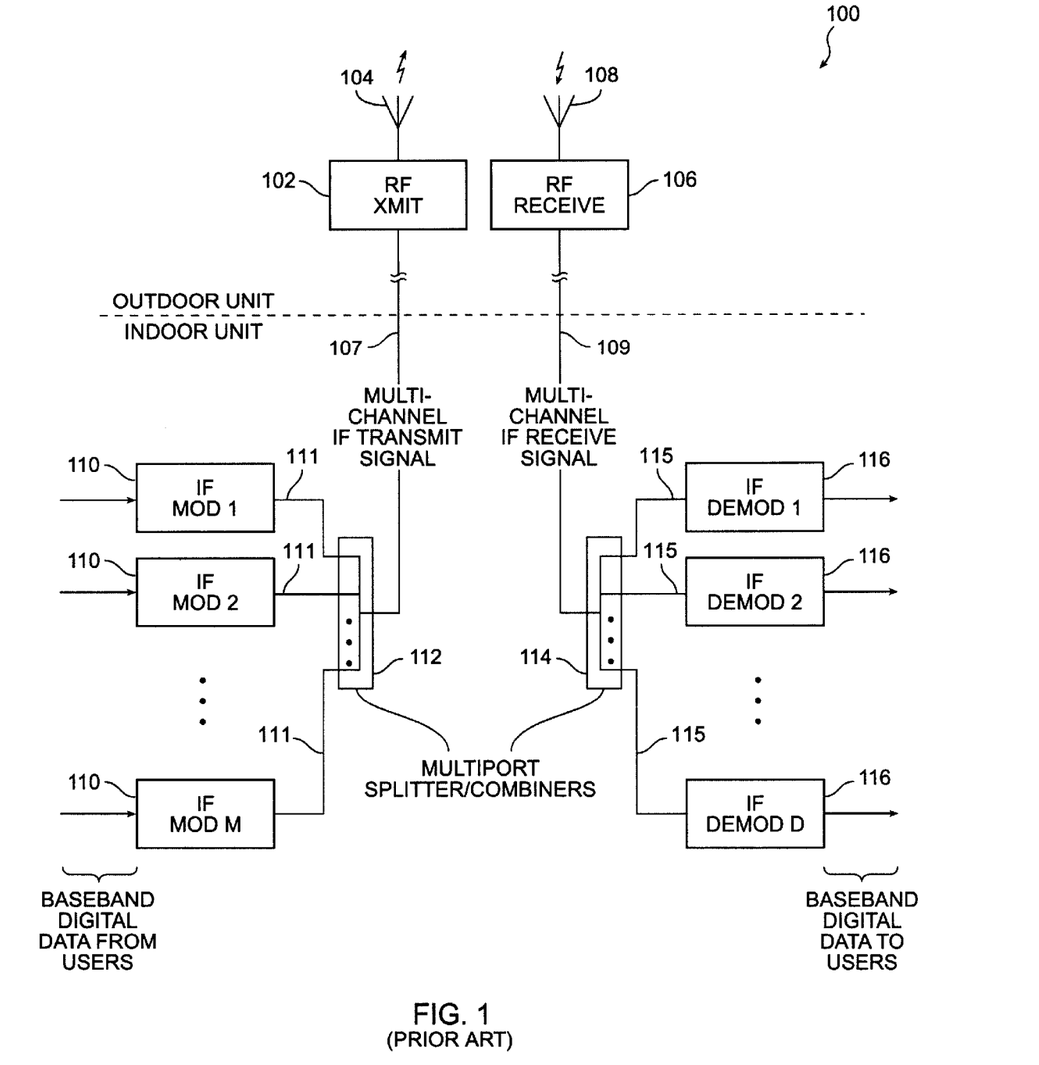
FIG. 1 depicts a typical multi-channel satellite communication facility.

A typical multi-channel satellite communication facility is shown in FIG. 1. Typically, an RF transmitter 102, a transmit antenna 104, an RF receiver 106, and a receive antenna 108 are located outdoors, while IF and baseband equipment are located indoors. The indoor and outdoor systems are connected via cables that carry multi-channel IF signals, comprising a transmit IF path 107 and a receive IF path 109. Individual IF transmit signals 111 from a number, M, of IF modulators 110 are combined in a multi-port signal combiner 112 to produce a multi-channel IF transmit signal on the transmit IF path 107. The multi-channel IF transmit signal is translated to the RF transmission frequency by the RF transmitter 102 which then amplifies the signal and broadcasts it via the transmit antenna 104.

The RF receiver 106 may share the transmit antenna 104, or it may have a receive antenna 108 of its own. The RF receiver 106 performs the complementary function to the RF transmitter 102, outputting a multi-channel IF received signal via the receive IF path 109 to a multi-port signal splitter 114 that distributes individual IF receive signals 115 to a number, D, of IF demodulators 116. Digital baseband data from the facility's users comes into the IF modulators 110 for transmission and is output to the facility's users from the IF demodulators 116. Note that a signal splitter or a signal combiner as discussed in the present invention may be implemented using the same device (signal splitter/combiner) which performs either function. Also, multi-port splitter/combiners as discussed in the present invention may be implemented as either a single device or as a number of devices in serial and/or parallel configurations.

In many practical systems, the above mentioned communication facility will broadcast to an intermediate site (such as a satellite transponder) which will rebroadcast the signal such that the originating facility will also receive its own signal. In such systems, the multi-channel IF received signal becomes a composite signal (multi-channel composite IF received signal).

Figure 2:
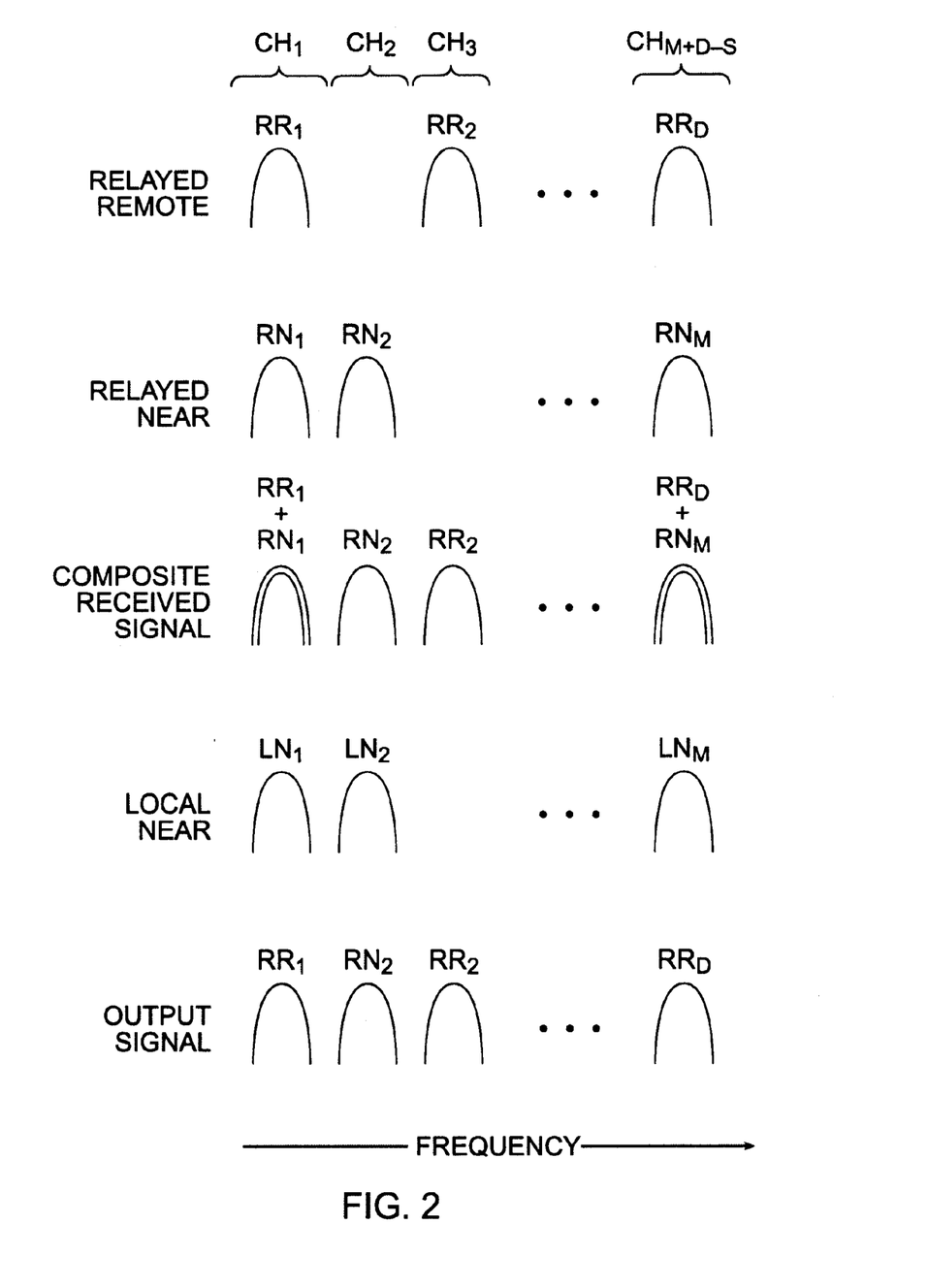
FIG. 2 is a frequency plot showing separate components of a multi-channel composite IF received signal.

FIG. 2 is an example frequency plot which shows the separate components of a multi-channel composite IF received signal. For clarity, only a few selected channels are shown. Note that although no absolute frequency is indicated in this plot, all of the signals shown are contained within the IF band that is used by the facility 100. Note also that "channel" refers generally to a particular frequency band occupied by one or more signal. However, a signal said to occupy a particular channel may not be perfectly contained within the associated frequency band. Often such a signal has some portions extending into neighboring channels. Such interference between channels occurs in many communication systems and is not discussed further in the present application.

The Relayed Remote (RR) signal is composed of the D signals ($RR_1$ to $RR_D$) originating from remote terminals and destined for the local demodulators. The Relayed Near (RN) signal is composed of the M signals ($RN_1$ to $RN_M$) that are due to the facility's own transmissions. That is, the RN signal has been transmitted and then relayed back to the facility. Thus, the multi-channel composite IF received signal (the "composite received signal") is the sum of the RR and the RN signals, as shown in FIG. 2.

Since the M signals corresponding to VR and the D signals corresponding to RN can overlap in frequency, the total number of channels in the composite received signal can vary. If no overlap exists, the total number of channels is simply M+D. However, if there is overlap such that S channels are shared, the total number of channels is M+D−S. In more general terms, the composite received signal has a total number of M+D−S channels (where S=0 indicates the condition that no overlap exists).

In this example, the first channel ($CH_1$) and the last channel ($CH_{M+D-S}$) of the composite received signal are shared (bi-directional), and the second channel ($CH_2$) and the third channel ($CH_3$) are not shared. In order to properly demodulate the RR signal contained in the shared channels, the composite received signal must be processed to remove the interfering RN signal. To simplify this self-interference removal, it may be helpful to take advantage of the Local Near (LN) signal, which is the IF signal that is output from the combination of the IF modulators and input to the RF transmitter. The desired output signal, shown in the bottom of the figure, contains all of the RR channels and any RN channel that did not overlap in frequency with any RR channel.

As can be seen from FIG. 2, the number of shared frequency channels may indeed be less than the total number of channels that exist in the multi-channel composite IF received signal. A technique is needed for performing efficient self-interference cancellation only on those channels where self-interference is present. Is also desirable to dynamically select channels for self-interference cancellation without the need to physically reconfigure the relevant subsystems.

SUMMARY OF THE INVENTION

Multi-channel self-interference cancellation is provided in relayed electromagnetic communication between a first device and one or more other devices on one or more shared frequency channels. Specifically, near signals are generated at the first device and transmitted to a relay station. A composite signal is received at the first device from the relay station containing relayed versions of the near signals and relayed versions of remote signals transmitted from the one or more other devices, the composite signal having frequency channels including the one or more shared frequency channels, each shared frequency channel occupied by at least one of the relayed near signals and one of the relayed remote signals. One or more cancellation signals are selectively generated, each having a frequency band corresponding to one of the shared frequency channels. The cancellation signals are combined with the composite signal to produce a desired signal representing the relayed remote signals.

In one embodiment, the cancellation signals are generated along one or more parallel paths and combined with the composite signal to produce the desired signal.

In another embodiment, the composite signal is processed by one or more cascaded stages to produce the desired signal, wherein at each cascaded stage, one of the cancellation signals is generated and combined with the composite signal.

The invention will be better understood by reference to the following description in connection with the accompanying drawings.

DETAILED DESCRIPTION OF THE INVENTION

Figure 3:
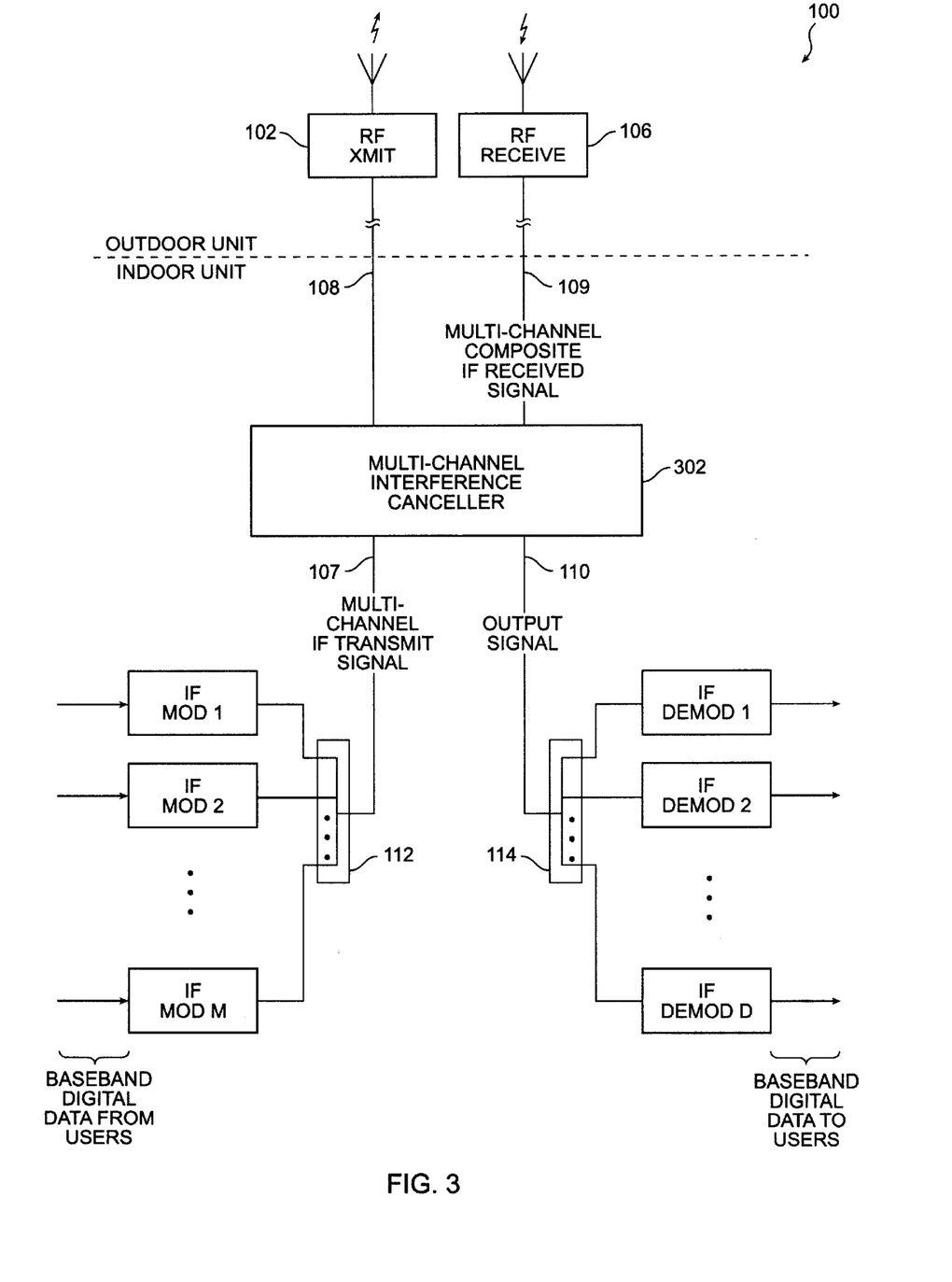
FIG. 3 depicts the desired configuration for integrating a multi-channel self-interference cancellation structure into an existing satellite communication facility.

FIG. 3 shows the desired configuration for integrating a multi-channel self-interference cancellation structure 302 into an existing satellite communication facility 100. The structure 302 receives the transmit IF path 107 from the multi-port signal combiner 112. The transmit IF path 107 contains the multi-channel IF transmit signal, which represents the Local Near (LN) signal. The structure 302 also receives the receive IF path 109 from the RF receiver 106. The receive IF path 109 contains the multi-channel composite IF received signal, which represents the sum of the Relayed Remote (RR) signal and the Relayed Near (RN) signal. The structure 302 outputs a continued transmit IF path 108 to the RF transmitter 102. The structure 302 also outputs a continued receive IF path 110 to the multi-port signal splitter 114.

As discussed above, existing self-interference cancellation techniques have been employed on individual channels. Certainly, each channel of a multi-channel system could be handled separately. That is, the received IF signal 109 can be split into D channels and each channel can be independently processed according to one of the existing self-interference cancellation techniques. To create a multi-channel output signal, all the channels would be combined back together. However, such a method requires equipment to process each of the D channels, even if some of the channels are not shared (such as the second channel in FIG. 2). For example, such equipment may include filters, upconverters, and/or downconverters to isolate and pass through the unshared frequency channels. As a result, performance of the unshared frequency channel will be degraded, since signals on the unshared frequency channels will receive additional processing.

Figure 4:
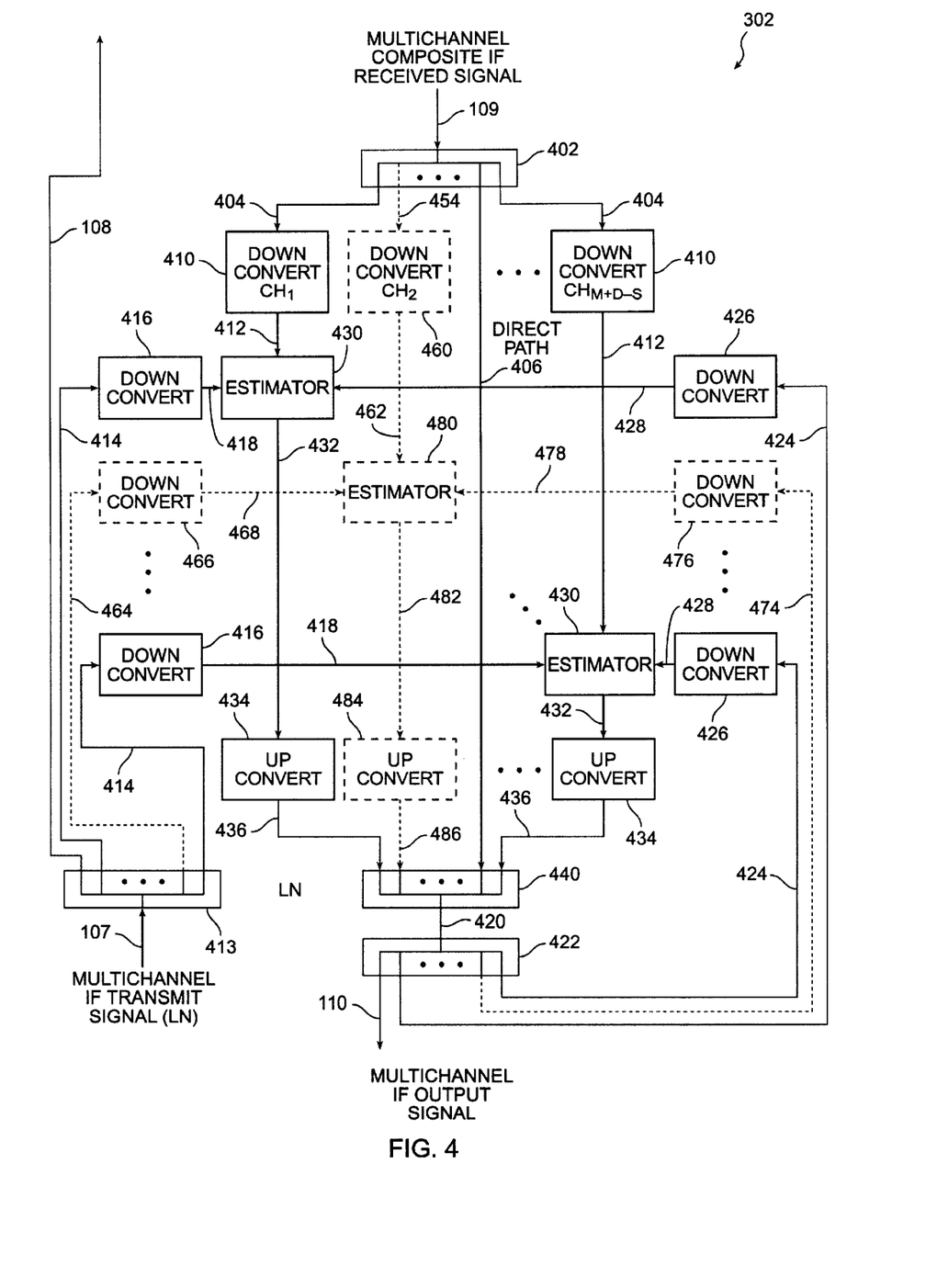
FIG. 4 illustrates one embodiment of the multi-channel self-interference cancellation structure, in a parallel configuration.

FIG. 4 illustrates one embodiment of the multi-channel self-interference cancellation structure 302, in a parallel configuration. The multi-channel composite IF received signal from the receive IF path 109 is split at a signal splitter 402 into a plurality of signals 404 and a direct path signal 406. Each of the plurality of signals 404 is to be associated with a shared frequency channel. The direct path signal 406 is an extra copy of the multi-channel composite IF received signal. Thus, the number of signals outputted by the signal splitter 402 is the number of shared frequency channels plus one.

For each shared frequency channel, one of the signals 404 is downconverted by a certain frequency shift using a downconverter 410 such that the shared frequency channel, which occupies a particular frequency band of the signal 404, is frequency-shifted to baseband. Each downconverter 410 thus generates a single channel baseband composite received signal 412.

The multi-channel IF transmit signal from the transmit IF path 107 is split at a signal splitter 413 into an extra copy of the multi-channel IF transmit signal and a plurality of signals 414. The extra copy of the multi-channel IF transmit signal is output from the multi-channel self-interference cancellation structure 302 on the continued transmit IF path 108. For each shared frequency channel, one of the signals 414 is downconverted by a certain frequency shift using a downconverter 416 such that the shared frequency channel, which occupies a particular frequency band of the signal 414, is frequency-shifted to baseband. Each downconverter 416 thus generates a single channel baseband Local Near (LN) signal 418.

A plurality of feedback signals 424 are used in the cancellation process. For each shared frequency channel, one of the feedback signals 424 is downconverted by a certain frequency shift using a downconverter 426 such that the shared frequency channel, which occupies a particular frequency band of the signal 424, is frequency-shifted to baseband. Each downconverter 426 thus generates a single channel baseband feedback signal 428.

For each shared frequency channel, a single channel self-interference cancellation signal estimator 430 receives a single channel baseband composite received signal 412, a single channel baseband LN signal 418, and a single channel baseband feedback signal 428, all of which correspond to the shared frequency channel. The estimator 430 uses these signals to generate and output a baseband estimate 432 of the Relayed Near (RN) signal, in phase-inverted form, associated with the shared frequency channel. The baseband estimate 432 is upconverted at an upconverter 434 to produce a single channel IF cancellation signal 436 occupying the shared frequency channel.

Each single channel self-interference cancellation signal estimator 430 receives a single channel baseband feedback signal 428 that is split at the signal splitter 422 and downconverted at the downconverter 426. There is a delay due to these two steps which can be incorporated into the adaptive filter of the estimator 430 (if an adaptive filter exists).

The single channel IF cancellation signals 436, each corresponding to a shared frequency channel, along with the direct path signal 406, which corresponds to the multichannel composite received signal, are combined at a signal combiner 440 to produce the multi-channel IF output signal 420. In this manner, the Relayed Near (RN) signal is substantially removed from all shared frequency channels of the multi-channel IF output signal. The signal 420 is input to a signal splitter 422, which outputs the continued receive IF path 110 and the feedback signals 424.

Figure 5:
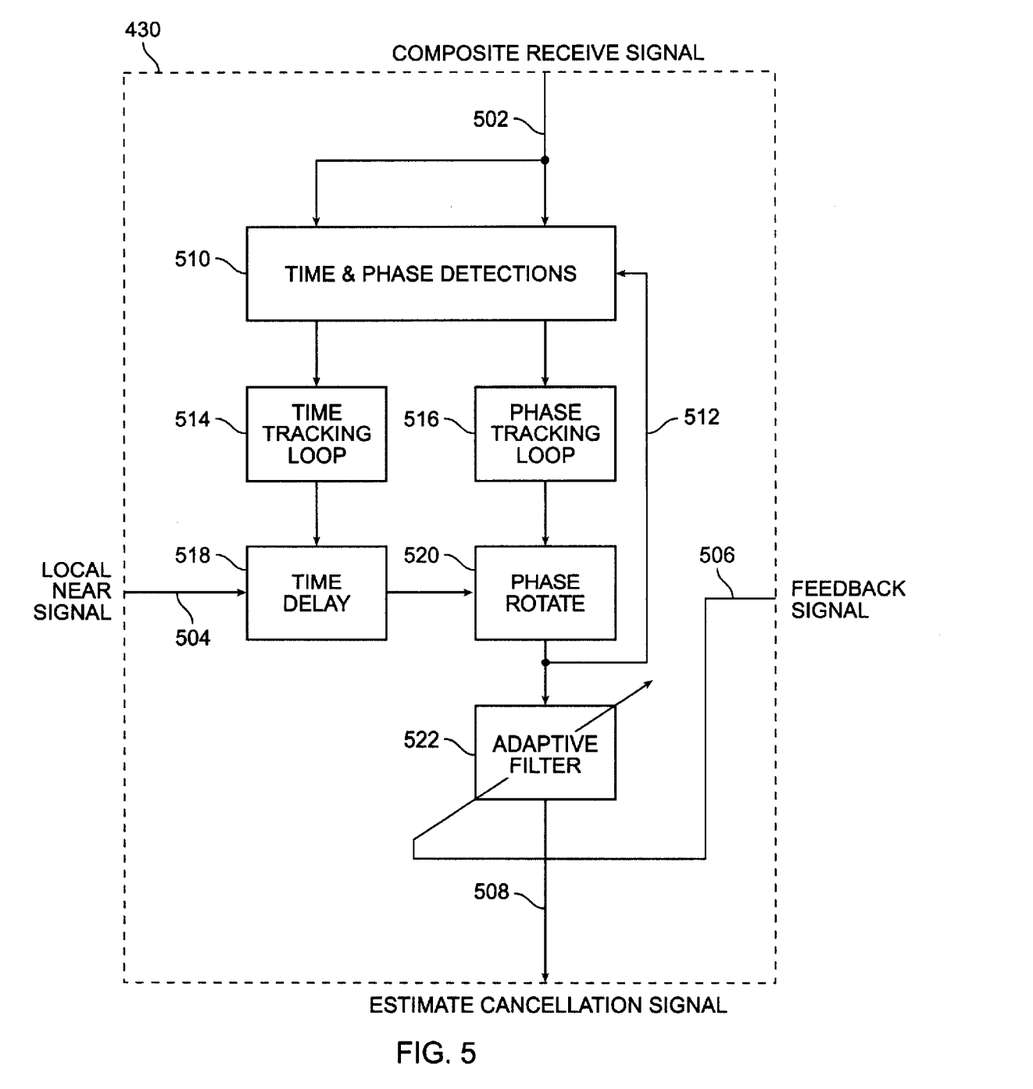
FIG. 5 shows one implementation of the single channel self-interference cancellation signal estimator.

FIG. 5 illustrates one implementation of the single channel self-interference cancellation signal estimator 430 derived from U.S. patent application Ser. No. 09/925,410 entitled METHOD AND APPARATUS FOR RELAYED COMMUNICATION USING BAND-PASS SIGNALS FOR SELF-INTERFERENCE CANCELLATION, discussed above. Note that the single channel self-interference cancellation signal estimator 430 can be implemented in many different ways. It can certainly be derived from other self-interference cancellation techniques disclosed in the prior art, such as those previously discussed.

In FIG. 5, the estimator 430 receives a composite received signal 502, a Local Near (LN) signal 504, and a feedback signal 506 and produces an estimate cancellation signal 508. As described below, the estimator 430 frequency-, phase-, and time-correlates the LN signal 504 with the composite received signal 502. The composite received signal 502 is input to a time and phase detectors block 510. A time-delayed and phase-rotated local near signal 512 is also input to the block 510. The time and phase detectors block 510 performs frequency, phase, and time correlation function(s) on its inputs and produces outputs that drive a time tracking loop block 514 and a phase tracking loop block 516.

The time-delayed and phase-rotated local near signal 512 is generated from the local near signal as herein explained. The local near signal is time-delayed by a time delay block 518, which is under the control of the time tracking loop block 514. The time-delayed signal is then phase-rotated by the phase rotation block 520, which is under the control of the phase tracking loop block 516. The phase rotation is capable of removing frequency differences between the local near signal and the received near (RN) component of the composite received signal. The resulting signal is the time-delayed and phase-rotated local near signal 512.

The time-delayed and phase-rotated local near signal 512 is input to an adaptive filter 522 to compensate for channel and relay effects. The adaptive filter 522 also receives the feedback signal 506. The adaptive filter 522 outputs the estimate cancellation signal 508, which for this implementation is an out of phase estimate of the RN signal.

An alternative implementation (not shown) of the single channel self-interference cancellation signal estimator 430 involves demodulating an appropriate Local Near (LN) signal corresponding to the shared frequency channel of interest from the composite received signal 502. The demodulated signal can be remodulated and the remodulated signal is produced as the output of this implementation of the single channel self-interference cancellation signal estimator 430.

Yet another implementation (not shown) of the single channel self-interference cancellation signal estimator 430 involves extracting from the composite received signal 502 a carrier signal corresponding to the shared frequency channel of interest. The carrier signal is then used to modulate an appropriate information sequence taken from the transmit path. The resultant signal is the output of this alternative implementation of the single channel self-interference cancellation signal estimator 430.

Referring back to FIG. 4, note that depending on the particular implementation, the single channel self-interference cancellation signal estimator 430 may not require as input the single channel baseband Local Near (LN) signal 418 and/or the single channel baseband feedback signal 428. If such is the case, the associated structures shown in FIG. 4 for generating the single channel baseband Local Near (LN) signal 418 and/or the single channel baseband feedback signal 428 may be eliminated.

As an illustrative example, consider the implementation discussed above that demodulates the RN signal from the composite signal and remodulates the RN signal. This particular implementation operates on the composite signal alone, without utilizing either the LN signal or the feedback signal. A multi-channel self-interference cancellation structure 302 having such an implementation of the single channel self-interference cancellation signal estimator 430 will not need to generate either the single channel baseband Local Near (LN) signals 418 or the single channel baseband feedback signals 428.

Yet another implementation (not shown) of the present invention on the transmit side would be possible if the individual IF transmit signals 111 from FIG. 1 were easily accessible as separate signals. In this case, each of the signals 111 is split into two output signals. Splitting all of the signals 111 in this manner produces two sets of the signals 111. The first set of signals 111 continue on the IF transmit path to a multi-port signal combiner, where they are combined to produce the multi-channel composite IF transmit signal 108 shown in FIG. 3. The second set of the signals 111 are input to the multi-channel self-interference cancellation structure 302. In FIG. 4, the second set of signals 111 are provided as the signals 414, which are inputs to the downconverters 416.

Likewise, another implementation (not shown) of the present invention on the receive side would be possible if the individual IF receive signals 115 of FIG. 1 were easily accessible as separate signals. In this case, each of the signals 115 is split into two output signals. Splitting all of the signals 115 in this manner produces two sets of the signals 115. The first set of signals 115 would continue on the IF receive path to the demodulators 116. The second set of signals 115 are input to the multi-channel self-interference cancellation structure 302. In FIG. 4, the second set of signals 116 are provided as the signals 404, which are inputs to the downconverters 410.

The multi-channel self-interference cancellation structure 302 may incorporate dynamic re-assignment of shared frequency channels. By using a controller unit (not shown) connected to the downconverters 410, downconverters 416, downconverters 426, and upconverters 434, the frequency spectrum location of each shared frequency channel can be changed by simply controlling these downconverters/upconverters to perform downconverting/upconverting according to newly defined frequency shifts. Accordingly, shared frequency channels can be redefined without requiring any physical modification of equipment by a technician. The flexibility of the multi-channel self-interference cancellation process is thus dramatically improved.

It is important to also note that the multi-channel self-interference cancellation structure 302, as embodied in FIG. 4, does not commit excessive equipment to unshared frequency channels. This is clearly illustrated by the fact that the number of signals produced from the signal splitter 402 only needs to be the number of shared frequency channels, S, plus one, not the total number of channels M+D−S (in the multi-channel composite received IF signal) plus one. For example, if channel 2 is an unshared frequency channel, then the signal splitter 402 needs not have an output 454 associated with channel 2.

Also, other equipment associated with channel 2, such as a downconverter 460, downconverter output 462, signal splitter output 464, downconverter 466, downconverter output 468, signal splitter output 474, downconverter 476, downconverter output 478, single channel self-interference cancellation signal estimator 480, estimator output 482, upconverter 484, and signal splitter input 486 need not be included in the multi-channel self-interference cancellation structure 302. According to the invention, such extra equipment corresponding to unshared frequency channels can be eliminated, as shown by dashed lines in FIG. 4. There will be little, if any, degradation on unshared channels, since the only processing that occurs to the original multi-channel signal is the subtraction of the LN signals from the shared channels.

Figure 6:
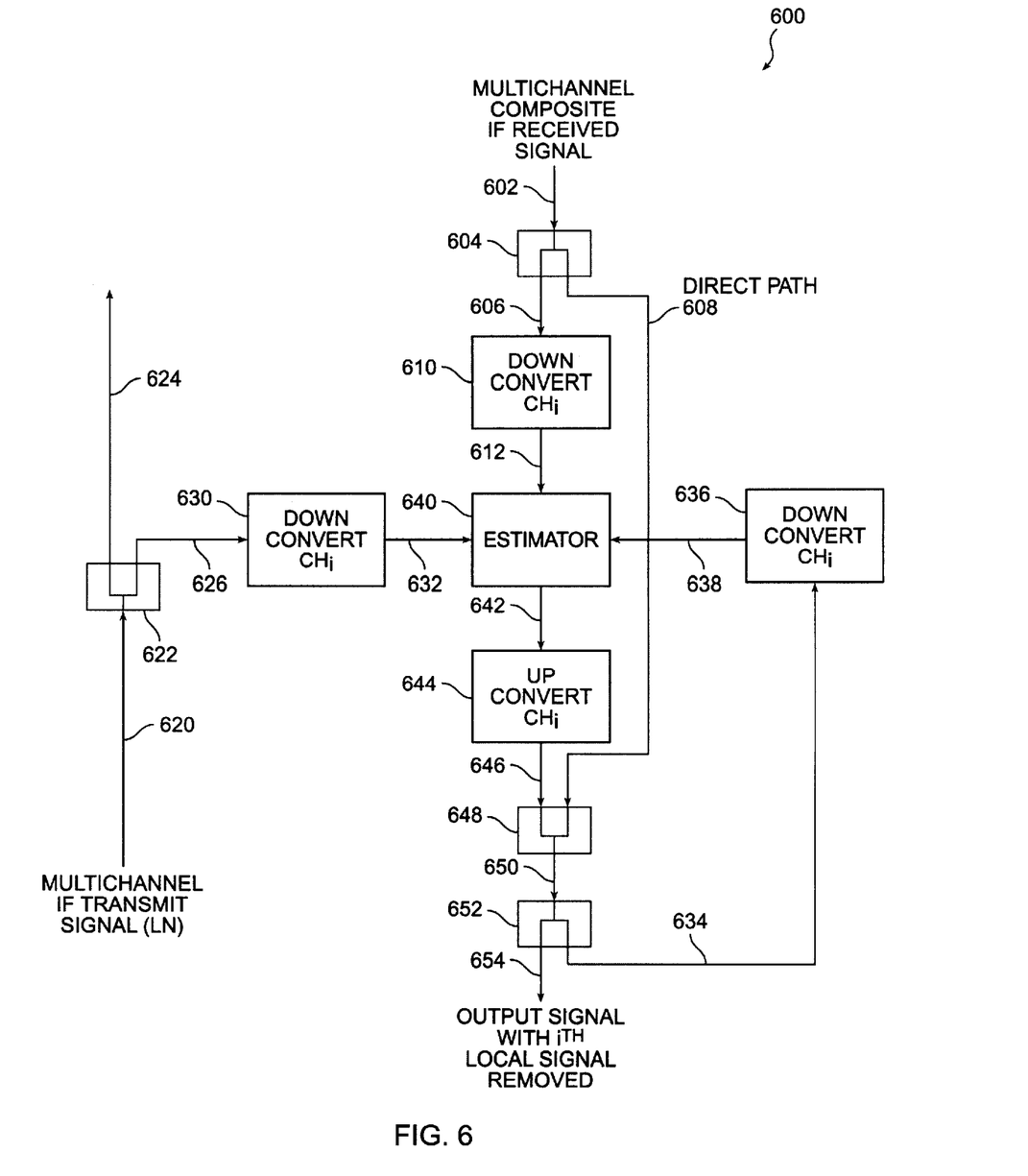
FIG. 6 illustrates another embodiment of the multi-channel self-interference cancellation structure, in a cascaded configuration.

FIG. 6 illustrates another embodiment of the multi-channel self-interference cancellation structure 302, in a cascaded configuration. Only one stage 600 (the ith stage) of the cascade is shown in FIG. 6. The number of stages corresponds to the number of shared frequency channels present, and the stages are placed one after another in a cascaded fashion. The ith stage 600 shown in FIG. 6 corresponds to a particular shared frequency channel.

A first input path 602 provides the multi-channel composite IF received signal from the stage previous to the ith stage 600. This signal is split at a signal splitter 604 into signals 606 and 608. The signal 608 is the direct path of the multi-channel composite IF received signal. The signal 606 is downconverted by a certain frequency shift using a downconverter 610 such that the shared frequency channel, which occupies a particular frequency band of the signal 606, is frequency-shifted to baseband, producing a single channel baseband composite received signal 612.

A second input path 620 provides the multi-channel IF transmit signal from the stage following the ith stage 600. This signal is split at a signal splitter 622 into a signal provided on a first output path 624 and a signal 626. The first output path 624 is connected to the stage previous to the ith stage 600. The signal 626 is downconverted by a certain frequency shift using a downconverter 630 such that the shared frequency channel, which occupies a particular frequency band of the signal 626, is frequency-shifted to baseband, producing a single channel baseband Relayed Near (RN) signal 632.

A feedback signal provided on a feedback path 634 is downconverted by a certain frequency shift using a downconverter 636 such that the shared frequency channel, which occupies a particular frequency band of the feedback signal, is frequency-shifted to baseband. This produces a single channel baseband feedback signal 638.

A single channel self-interference cancellation signal estimator 640 receives the single channel baseband composite received signal 612, the single channel baseband LN signal 632, and the single channel baseband feedback signal 638. The estimator 640 uses these signals to generate and output a baseband estimate 642 of the Relayed Near (RN) signal, in phase-inverted form, associated with the shared frequency channel to which the ith stage 600 corresponds. The baseband estimate 642 is upconverted at an upconverter 644 to produce a single channel IF cancellation signal 646 occupying the particular shared frequency channel.

The single channel IF cancellation signal 646 and the signal 608 that is the extra copy of the multi-channel composite IF received signal, are combined at a signal combiner 648 to produce a stage-processed multi-channel IF output signal 650. The stage-processed multi-channel IF output signal 650 is split at a signal splitter 652 into two paths, a second output path 654 and the feedback path 634. The second output path 654 is connected to the stage following the ith stage 600. The feedback path 634 provides the stage-processed multi-channel IF output signal 650 as the feedback signal.

The stage-processed multi-channel IF output signal 650, provided to the stage following the ith stage 600 via the second output path 654, has the ith Local Near (LN) signal substantially removed. That is, the ith stage 600 substantially removes the LN signal from the shared frequency channel corresponding to the ith stage 600.

Note that the single channel self-interference cancellation signal estimator 640 receives the single channel baseband feedback signal 638, which is split at the signal splitter 653 and downconverted at the downconverter 636. The delay of these two steps can be incorporated into the adaptive filter of the estimator 640 (if an adaptive filter exists).

The ith stage 600 connects with a previous stage via the first input path 602 and the first output path 628 and connects with a following stage via the second input path 620 and the second output path 654. In this manner, a number of cascading stages can be constructed, each performing substantial removal of the RN signal associated with a particular shared frequency channel. One particular advantage of this cascade approach is that it readily scales. Each additional stage is placed in-line with the others, using two-port signal splitters/combiners. There is no need for differently sized signal splitters/combiners. Another advantage of the cascade approach is that each stage can be made 'fail-safe.' If there is a failure in one stage, that stage can easily be skipped through the use of bypass switches.

Note that the single channel self-interference cancellation signal estimator 640 can be implemented in many different ways, as discussed for the single channel self-interference cancellation signal estimator 430 of FIG. 4. Similarly, estimator 640 can be derived from any one of a number of self-interference cancellation techniques existing in the prior art.

Also, depending on the particular implementation, the single channel self-interference cancellation signal estimator 640 may not require as input the single channel baseband Local Near (LN) signal 632 and/or the single channel baseband feedback signal 638. If such is the case, the associated structures shown in FIG. 6 for generating the single channel baseband Local Near (LN) signal 632 and/or the single channel baseband feedback signal 638 may be eliminated.

The multi-channel self-interference cancellation structure 302, as embodied in the cascaded configuration illustrated in FIG. 6, may incorporate dynamic re-assignment of shared frequency channels. By using a controller unit (not shown) connected to the appropriate downconverters and upconverters of each stage, the frequency spectrum location of each shared frequency channel can be changed by simply controlling these downconverters/upconverters to perform downconverting/upconverting according to newly defined frequency shifts. For example, in the ith stage 600, such a control unit may control downconverter 610, 630, and 636 and upconvert 644. Accordingly, shared frequency channels can be re-defined without requiring any physical modification of equipment by a technician. The flexibility of the multi-channel self-interference cancellation process is thus dramatically improved.

It is important to also note that the multi-channel self-interference cancellation structure 302, as embodied in the cascaded configuration illustrated in FIG. 6, does not commit excessive equipment to unshared frequency channels. This is clearly illustrated by the fact that the number of cascaded stages correspond to the number of shared frequency channels, not the total number of channels M+D−S of the multi-channel signal. Extra stages corresponding to unshared frequency channels need not exist. According to the invention, such extra equipment can be eliminated. A distinct advantage of the invention is the low level of signal degradation that is achieved for both the shared and un-shared channels.

Although the present invention has been described in terms of specific embodiments, it should be apparent to those skilled in the art that the scope of the present invention is not limited to the described specific embodiments.

The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for providing self-interference cancellation in relayed electromagnetic communication between a first device and one or more other devices through a relay station comprising the steps of:
   generating at said first device a plurality of near signals;
   simultaneously transmitting said near signals from said first device to said relay station;
   receiving at said first device a composite signal from said relay station, said composite signal containing relayed versions of said near signals and relayed versions of a plurality of remote signals transmitted from said one or more other devices, said composite signal having multiple frequency channels including one or more shared frequency channels, each said shared frequency channel being occupied by at least one of said relayed near signals and one of said relayed remote signals;
   selectively generating one or more cancellation signals, each said cancellation signal having a frequency band corresponding to one of said shared frequency channels, each said cancellation signal representing a phase-inverted version of the relayed near signal occupying said one of said shared frequency channels; and
   combining said cancellation signals with said composite signal to produce a desired signal representing said relayed remote signals.

2. The method of claim 1, wherein said cancellation signals are generated along one or more parallel paths and combined with said composite signal to produce said desired signal.

3. The method of claim 1, wherein said composite signal is processed by one or more cascaded stages to produce said desired signal, wherein at each said cascaded stage, one of said cancellation signals is generated and combined with said composite signal.

4. The method of claim 1, wherein said step of selectively generating said one or more cancellation signals further comprises, for each cancellation signal:
   downconverting said composite signal such that said one of said shared frequency channels of said composite signal is frequency shifted to baseband to produce a single channel composite signal;
   using said single channel composite signal, generating an estimate signal estimating the relayed near signal occupying said one of said shared frequency channels; and
   upconverting said estimate signal to a frequency associated with said one of said shared frequency channels to produce said cancellation signal.

5. The method of claim 1, wherein said step of selectively generating said one or more cancellation signals further comprises, for each cancellation signal:
   frequency-, phase-, and time-correlating a representation of said composite signal corresponding to said one of said shared frequency channels with a representation of the local near signal occupying said one of said shared frequency channel.

6. The method of claim 5, further comprising to step of:
   filtering a signal resulting from said correlation using an adaptive filter, said adaptive filter receiving via a feedback path a representation of said desired signal corresponding to said one of said shared frequency channels.

7. The method of claim 1, wherein said step of selectively generating said one or more cancellation signals further comprises, for each cancellation signal:
   from said composite signal, demodulating the relayed near signal occupying said one of said shared frequency channels to produce a demodulated signal; and
   remodulating said demodulated signal.

8. The method of claim 1, wherein said step of selectively generating said one or more cancellation signals further comprises, for each cancellation signal:
   generating from said composite signal a carrier signal corresponding to said one of said shared frequency channels; and
   using said carrier signal, modulating an information sequence taken from a transmit path of said first device.

9. The method of claim 1, wherein at least one of said shared frequency channels is dynamically re-assigned to a new frequency bad using a control unit.

10. A system for providing self-interference cancellation in relayed electromagnetic communication between a first device and one or more other devices through a relay station, the system comprising:

means for generating at said first device a plurality of near signals;

means for simultaneously transmitting said near signals from said first device to said relay station;

means for receiving at said first device a composite signal from said relay station, said composite signal containing relayed versions of said near signals and relayed versions of a plurality of remote signals transmitted from said one or more other devices, said composite signal having multiple frequency channels including one or more shared frequency channels, each said shared frequency channel being occupied by at least one of said relayed near signals and one of said relayed remote signals;

means for selectively generating one or more cancellation signals, each said cancellation signal having a frequency band corresponding to one of said shared frequency channels, each said cancellation signal representing a phase-inverted version of the relayed near signal occupying said one of said shared frequency channels; and means for combining said cancellation signals with said composite signal to produce a desired signal representing said relayed remote signals.

* * * * *